T. F. HUNTER.

HOISTING MEANS.

APPLICATION FILED SEPT. 1, 1920.

Reissued Jan. 18, 1921. 15,028.

2 SHEETS—SHEET 1.

Inventor:
Thomas F. Hunter
Daniel J. Brennan.
Attys

T. F. HUNTER.

HOISTING MEANS.

APPLICATION FILED SEPT. 1, 1920.

Reissued Jan. 18, 1921. 15,028.

2 SHEETS—SHEET 2.

Inventor:
Thomas F. Hunter

Daniel F. Brennan.
Attys.

UNITED STATES PATENT OFFICE.

THOMAS F. HUNTER, OF CHICAGO, ILLINOIS.

HOISTING MEANS.

15,028. Specification of Reissued Letters Patent. Reissued Jan. 18, 1921.

Original No. 1,303,322, dated May 13, 1919, Serial No. 261,040, filed November 4, 1918. Application for reissue filed September 1, 1920. Serial No. 407,534.

*To all whom it may concern:*

Be it known that I, THOMAS F. HUNTER, a citizen of the United States, residing at Chicago, county of Cook, and State of Illinois, have invented certain new and useful Improvements in Hoisting Means, of which the following is a specification.

The invention relates to an elevating or hoisting means which is principally, although not exclusively, used by building contractors.

It is an object of the invention to provide a hoisting apparatus which is so arranged that an uneven loading of the carrier does not effect tilting thereof.

It is a further object of the invention to provide a carrier which is raised by a plurality of cables exerting a lifting force on both sides of the carrier so as to insure its level raising or lifting.

It is also an object of the invention to provide a hoisting means which is adapted to elevate long flexible members, such as reinforcing rods, without permitting deflection of said flexible members during the elevating movement, which would necessitate the lifting of the carrier considerably above the level of the platform on which the flexible members are to be discharged.

To the accomplishment of the objects stated and others that will become apparent upon perusal of the description, the preferred embodiment of the invention comprises a means set forth in the following specification, particularly pointed out in the appended claims and illustrated in the annexed drawings, the annexed drawings however, disclosing merely one of the various ways in which the principle of the invention may be utilized.

In said drawings—

Figure 1:
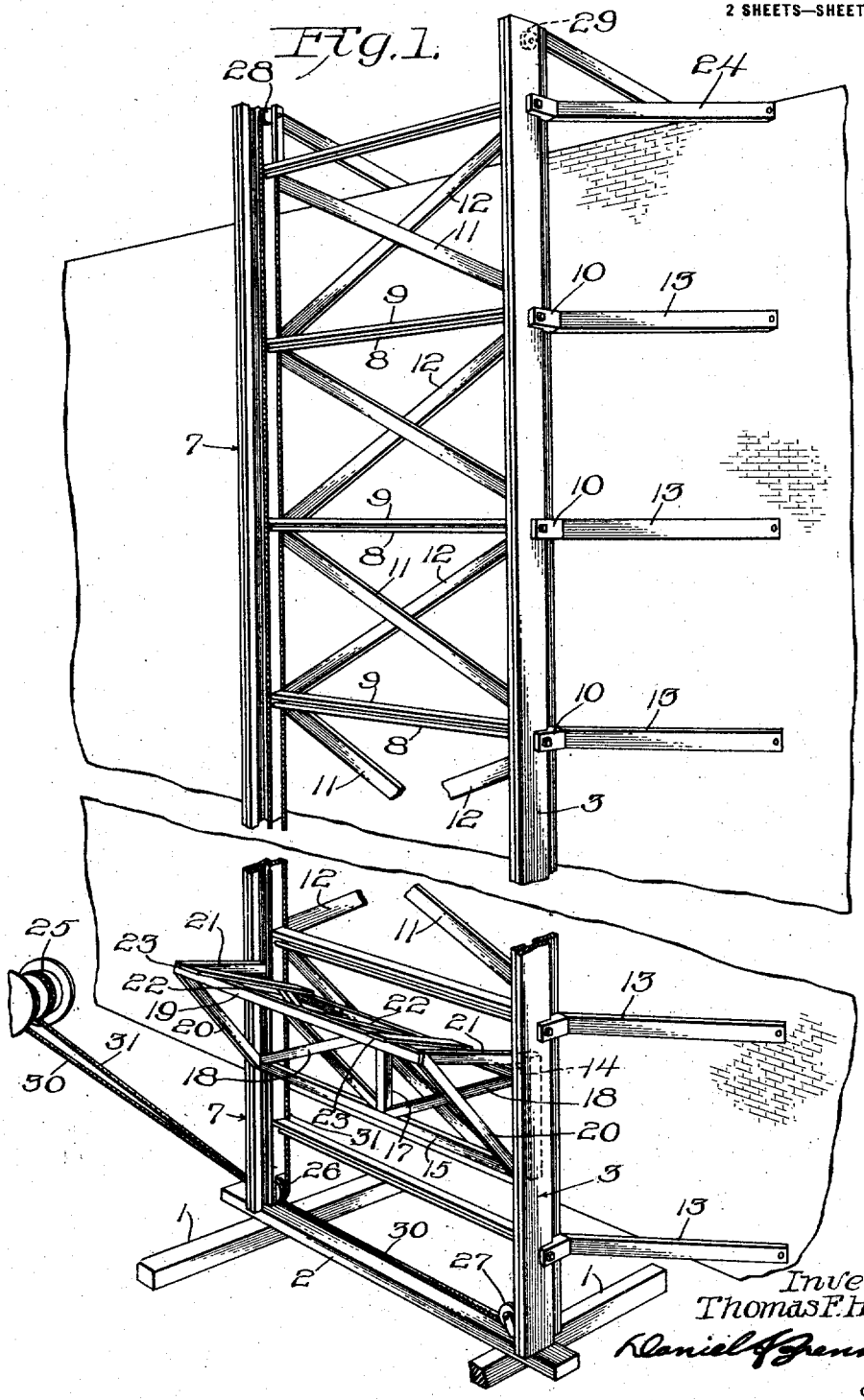
Figure 1 is a perspective elevational view of a hoisting apparatus constructed in accordance with my invention.
Figure 2:
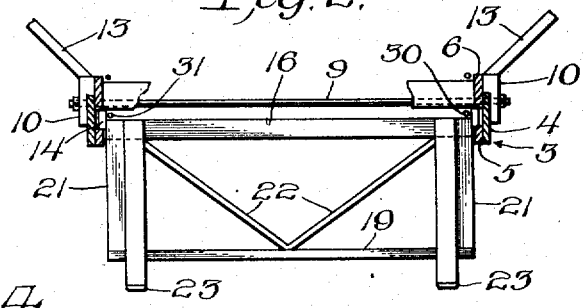
Fig. 2 is a horizontal section of the device.
Figure 4:
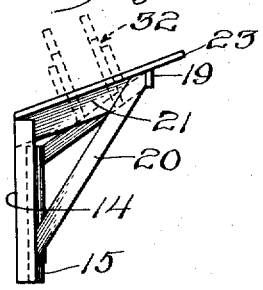
Fig. 4 is a side view of the same.
Figure 3:
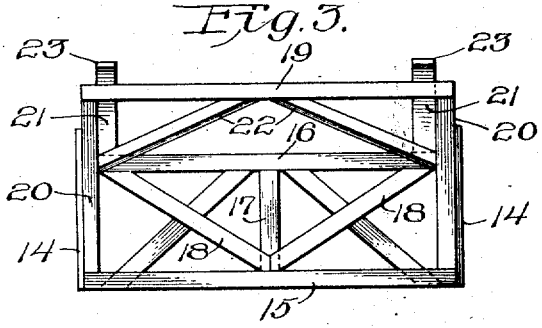
Fig. 3 is a front view of the carrier.

Referring particularly to Figs. 1–4, 1 designates a plurality of members arranged on the ground and serving as a foundation or supporting means for the hoisting frame by means of which articles to be lifted are elevated. The members 1 are superposed by a transverse member 2, which forms a supporting element for uprights, generally designated by 3 and 7, and spaced a suitable distance in accordance with the length of the carrier. The upright 3, as indicated particularly in Fig. 2, comprises an outer member 4 of rectangular cross section which at the front edge is flush with a member 5 and secured to its inner side. A member 6 spaced a short distance from member 5 is secured to the outer member 4 but extends therebeyond. The space defined by members 5 and 6 constitutes a guide slot or groove and is provided for the reception of a member of the carrier for which purpose the groove is well greased so as to permit raising and lowering of the carrier without undue frictional resistance. The coacting upright 7 of the same construction as upright 3, is maintained in fixed relation to the latter by spacing members 8 and tie rods 9, which extend through the members 6 and 4 (Fig. 2) and through blocks 10 to thereby constitute a rigid structure. Lattices 11 and 12 reinforce the structure and a plurality of braces 13 are secured to the structure and to the building wall whereby the frame is maintained in vertical position and secured against movement.

The carrier comprises vertical members 14 of a width to slidingly fit in the inner grooves of the uprights 3 and 7 and these members are interconnected by the connecting beams 15 and 16, which together with the vertical members 14 constitute the frame of the carrier. At the center the frame is braced by the vertical member 17 and by diagonal beams 18. At a distance from this frame a bar 19 is provided which is connected to the frame by the members 20 and connecting pieces 21, and in addition diagonal connecting pieces 22 rigidly secure the beam 19 to the frame of the carrier. Skids 23 are supported at the top of the vertical members 14 and the longitudinal member 19, and in oblique position for the purpose of enabling the load raised thereon to automatically slide off by gravity whenever the hoist has reached discharging position.

As shown in Fig. 1, the upright members 3 and 7 are equipped with skids 24 which bridge the space between the hoisting element and the discharging platform and form a continuation of the skids 23 of the carrier when the latter has reached the topmost or discharging position. The means for raising or lowering the carrier includes a drum 25, arranged at a suitable location in the vicinity of the hoisting structure and driven from any source of power, not shown. The uprights 3 and 7 are respectively provided with guide sheaves 26 and 27 at the lower extremity thereof, and suitable guide sheaves 28 and 29 are arranged at the upper extremity of said upright members. Two cables 30 and 31, winding on the drum 25, are respectively trained around the sheaves 26 and 28, of the upright 7, and around the sheaves 27 and 29 of the upright 3, and are secured to the adjacent ends of the carrier. From the foregoing it is obvious that upon rotation of the drum in proper direction the carrier is raised by a lifting pull exerted at both ends thereof, so that at uneven loading of the carrier tilting thereof is precluded. The tilting of the carrier is a disadvantageous feature incident to the known hoisting devices in which one cable is employed secured to the middle portion of the carrier whereby the latter is raised.

Figure 5:
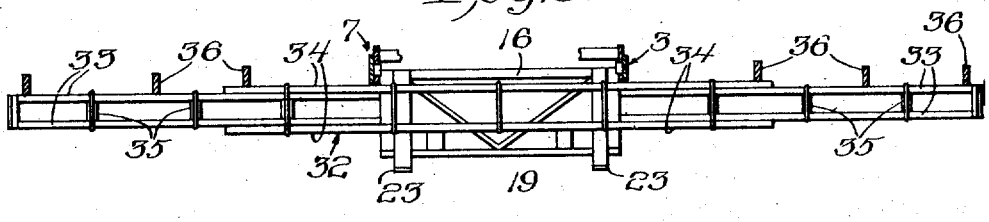
Fig. 5 is a top plan view of a cradle used in conjunction with the carrier in elevating long flexible members, such as reinforcing rods.
Figure 6:
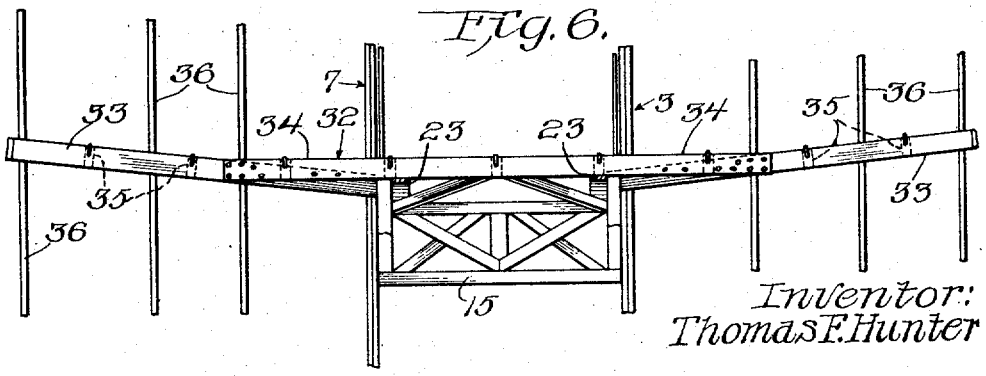
Fig. 6 is a front view of the parts shown in Fig. 5.

In the construction of buildings it is frequently necessary to hoist long flexible members such as very long thin flexible reinforcing rods, which are considerably longer than the carrier and which, according to the way we first attempted, overhang the same and make it necessary for the carrier to be raised until the overhanging and downwardly extending ends of the flexible members are flush with the discharging platform. To obviate the necessity of raising the carrier above the discharging platform and to prevent the flexible members from extending beyond the carrier, a cradle, generally designated by 32, is provided which is arranged on the carrier and in conjunction therewith serves as a lifting member for the long flexible rods. As indicated in Figs. 5 and 6 the cradle comprises longitudinal members 33 secured to central members 34, and a plurality of spacing blocks 35 are arranged at proper distances and interconnected with the members by rods extending therethrough. The inner ends of the members 33 abut the oblique members 21 of the carrier to form a rigid structure therewith. The longitudinal members of the cradle when arranged on the carrier occupy different horizontal planes to provide for the skidding effect of the load carried thereon and when the cradle is used in connection with the carrier the skids 23 may be dispensed with. To insure proper movement of the cradle together with the carrier a plurality of vertical guide beams 36 are arranged to contact with the inner longitudinal members of the cradle and properly braced to the building wall in any preferred or convenient manner. The operation of the improved hoist is thought to be obvious from the foregoing description and further reference thereto is thought superfluous.

While the drawings disclose a preferred embodiment of the invention it is, of course, understood that many changes and alterations may be made without departing from the spirit of the invention, and it is not the intention of limiting the invention to the details as shown, but to include all modifications constituting departures within the scope of the invention as defined by the appended claims.

I claim:

1. In a hoisting apparatus, in combination, a pair of uprights, a carrier reciprocatingly fitted between said uprights, a platform detachably arranged on said carrier and extending beyond the ends of said carrier to receive long articles, and means for exerting a lifting pull to both ends of said carrier.

2. In a hoisting apparatus, in combination, a pair of uprights, a discharging platform, inclined skids connecting the upper ends of said uprights with said platform, a carrier reciprocatingly fitted between said uprights, a loading platform detachably arranged on said carrier and extending beyond the ends thereof to receive long articles, said platform carrying the load so as to permit its rolling off onto the skids when in discharging position, means for exerting a lifting pull to both ends of said carrier, and means for guiding the said loading platform during its reciprocation.

3. In a hoisting apparatus, in combination, a pair of uprights provided with inner vertical grooves, a carrier reciprocatingly fitted between said uprights and comprising vertical members guided in said grooves, side members supported on said vertical members, an auxiliary platform adapted to be placed on said side members, said auxiliary platform including longitudinal members bearing against said side members, connecting beams resting on said side members and interconnecting the longitudinal members of said platform, and means for exerting a lifting pull to both ends of said carrier.

4. In a hoisting apparatus, the combination of a pair of uprights, a carrier reciprocatingly fitted between said uprights, said carrier comprising a central carrying portion inclined in direction toward the plane of the uprights, and lateral portions projecting laterally beyond the uprights and inclined toward the central portion.

5. In a hoisting apparatus, the combination of a pair of uprights, a carrier reciprocatingly fitted between said uprights, said carrier comprising a central carrying portion inclined in direction toward the plane of the uprights, and lateral carrying portions projecting beyond the uprights and inclined toward the central portion and toward the plane of the uprights.

6. In hoisting apparatus, the combination of a pair of uprights, a carrier reciprocatingly fitted between said uprights, a cradle detachably arranged on said carrier and extending considerably beyond the ends of said carrier to receive and convey without bending or distortion long flexible reinforcing rods and means for raising and lowering said carrier.

7. In a building hoisting means for conveying without distorting long thin flexible reinforcing rods from the ground up the outside of a building under construction and automatically delivering them downwardly and inwardly on a discharge platform as desired, comprising in combination a relatively high perpendicular frame constructed adjacent to a building and attached and reinforced thereto throughout from top to bottom for holding said frame in alinement, means mounted on said frame and adapted to move up and down with respect thereto, a supporting element arranged thereon for carrying long thin flexible rods without distorting, means attached to the the upper end of said frame and extending downwardly and inwardly therefrom for automatically delivering such rods inwardly and away from the edge of the building and means for raising and lowering said conveying means.

8. In a building hoisting means for conveying without distorting long thin flexible reinforcing rods from the ground up the outside of a building under construction and automatically delivering them downwardly and inwardly on a discharge platform as desired, comprising in combination a relatively high perpendicular frame constructed adjacent to a building and attached and reinforced thereto throughout from top to bottom for holding said frame in alinement, means mounted on said frame and adapted to move up and down with respect thereto, a supporting element arranged thereon for conveying long thin flexible rods without distorting, means attached to the upper end of said frame and extending downwardly and inwardly therefrom for automatically delivering such rods inwardly and away from the edge of the building, means for raising and lowering said conveying means and means secured to the building for guiding said rods during the elevating movement and before reaching the discharging position.

9. In a hoisting apparatus, the combination of a pair of relatively high perpendicular uprights, a carrier reciprocatingly mounted in said uprights, a supporting element arranged on said carrier and extending beyond the sides thereof to receive and convey without distorting long thin flexible reinforcing rods up and over the upper end of said uprights on to a downwardly and inwardly inclined delivering means, and means for raising and lowering said carrier.

10. In a hoisting apparatus for conveying long thin flexible rods up the outside of a building and delivering them downwardly and inwardly as desired, comprising in combination a pair of relatively high perpendicular uprights constructed near a building, means for holding said uprights in alinement and a carrier with a suitable supporting element for supporting long thin flexible rods throughout a considerable portion of the length thereof sufficiently to prevent distorting said carrier being spaced away from the building sufficiently to prevent the rods being handled from engaging therewith and means for raising and lowering said carrier.

In witness whereof, I hereunto subscribe my name to this specification in the presence of two witnesses.

THOMAS F. HUNTER.

Witnesses:
S. Opie Read,
Andrew G. Schneider.